Figure 1:
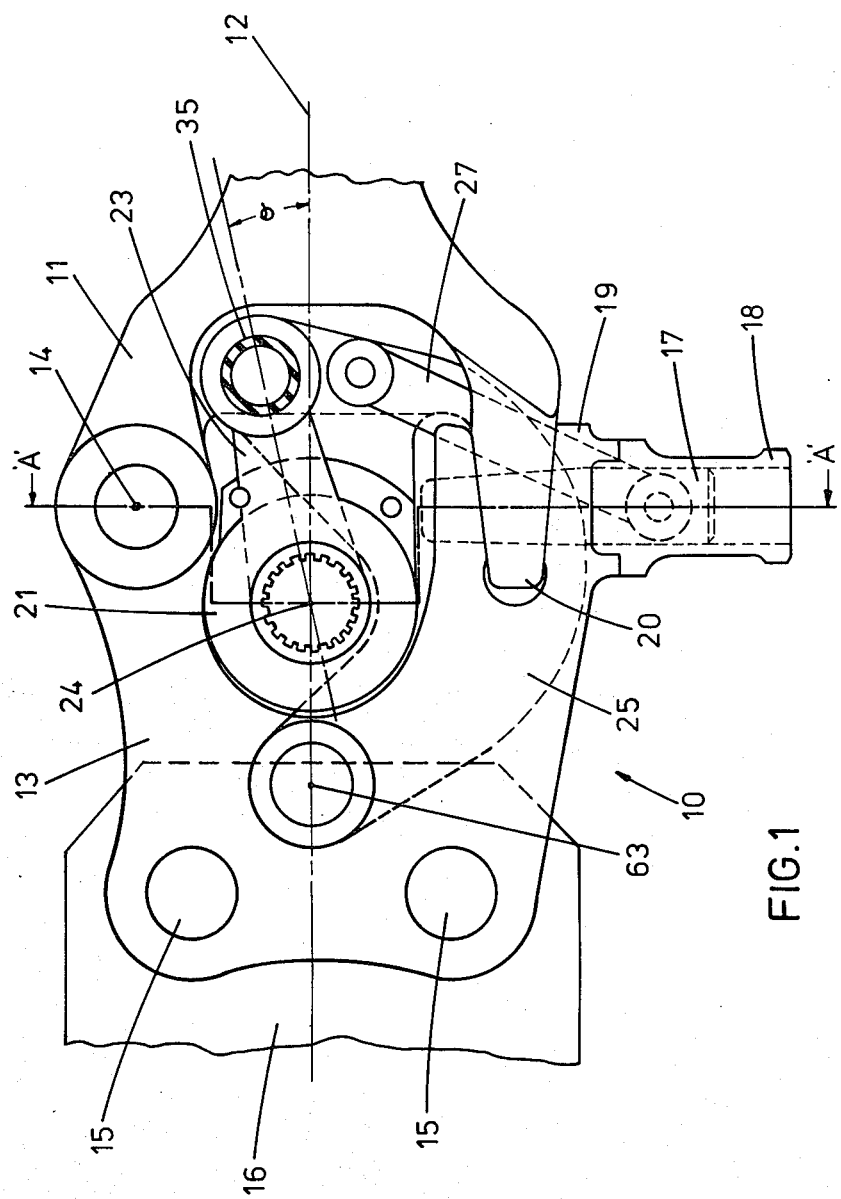

United States Patent [19]

Watson

[11] 4,436,483

[45] Mar. 13, 1984

[54] HELICOPTER ROTORS

[75] Inventor: Kenneth Watson, Yeovil, England

[73] Assignee: Westland plc, Yeovil, England

[21] Appl. No.: 338,103

[22] Filed: Jan. 8, 1982

[30] Foreign Application Priority Data

Jan. 22, 1981 [GB] United Kingdom ................ 8101871

[51] Int. Cl.³ .................... B64C 11/28; B64C 27/50
[52] U.S. Cl. ..................................................... 416/143
[58] Field of Search ............................... 416/143, 142

[56] References Cited

U.S. PATENT DOCUMENTS

| | | | |
|---|---|---|---|
| 2,950,767 | 8/1960 | Lemont | 416/143 |
| 3,097,701 | 7/1963 | Buivid | 416/143 |
| 3,153,455 | 10/1964 | Mosinskis | 416/143 X |
| 3,187,818 | 6/1965 | Barrett et al. | 416/143 X |
| 3,247,907 | 4/1966 | Mosinskis | 416/143 X |
| 3,438,446 | 4/1969 | Vacca et al. | 416/143 |
| 3,743,441 | 7/1973 | Ferris | 416/143 |
| 3,749,515 | 7/1973 | Covington et al. | 416/143 |

*Primary Examiner*—Everette A. Powell, Jr.
*Attorney, Agent, or Firm*—Larson and Taylor

[57] ABSTRACT

A helicopter rotor includes a powered blade fold mechanism adapted to move a rotor blade between a spread operational position and a folded position and at least one lock pin (17) to lock the blade in its spread position. The mechanism includes a rotary power source (21) and a mechanical linkage (23, 25) having an over-center position and adapted so that energization of the power source in one direction moves the linkage through the over-center position to withdraw the lock pin and fold the blade, and energization in the other direction moves the blade to the spread position and re-inserts the lock pin automatically as the linkage moves back through its over-center position. Lock means may be provided to lock the blade in pitch and, in one embodiment particularly adapted for use in an articulated rotor, the lock means includes pitch, flap and lag locks.

16 Claims, 11 Drawing Figures

HELICOPTER ROTORS

DESCRIPTION OF INVENTION

This invention relates to helicoptor rotors and particularly to such rotors incorporating a powered blade folding mechanism adapted to move a rotor blade between a spread position for normal operation and a folded position for storage.

It is often desirable to fold the rotor blades of a helicopter over its fuselage in order to reduce the required handling and stowage area, especially when operating such helicopters from confined spaces.

Existing powered fold mechanisms are generally very complex and bulky devices requiring a high level of servicing and maintenance activity, and causing very high aerodynamic drag loads during flight of the helicopter. One such device is hydraulically operated and utilises complex gear sectors for folding and a separate hydraulic system for extraction and re-insertion of blade locking pins. Other types of blade fold mechanisms (see for instance GB-A-No. 1375658) use complicated series of links and cams, most of which are located externally of the blade and hub and are therefore vulnerable to damage and corrosion as well as being aerodynamically unsound.

Accordingly, in one aspect the invention provides a helicopter rotor having a rotor hub, a blade pivotally connected to said hub for movement about a generally vertical fold axis between an operational spread position and a folded position, at least one lock pin for locking said blade in the spread position, and a powered fold mechanism comprising a reversible rotary power source, characterised in that said power source is operatively connected to a mechanical linkage having an over-centre position and adapted so that energisation of the power source in one direction moves the linkage through the over-centre position to withdraw the or each lock pin and pivot the blade to its folded position, and energisation in the other direction moves the blade from its folded to its spread position and re-inserts the lock pin(s) as the linkage moves back through its over-centre position.

The vertical fold axis may be coincident with a pivotal connection between the hub and a blade attachment cuff that provides for bolted attachment of the blade and may be located to one side of a longitudinal centreline.

The linkage may comprise a lever rotationally fixed to the power source for rotation about a vertical axis coincident with the centreline to extend with the blade in the spread position, inwardly therefrom, and a rigid link pivotally connected to the free end of the lever and extending outwardly therefrom for pivotal attachment about a vertical axis to the cuff. The lever may be located at an acute angle from a line extending through the rotational axis and the vertical attachment axis and on the same side thereof as the fold axis. In one embodiment, the vertical attachment axis is coincident with the centreline when the blade is in the spread position, and in an alternative embodiment, the vertical attachment axis is coincident with the bolted blade attachment. A resilient annular bush may be located in one of the pivotal connections of the link.

The or each lock pin may be supported for horizontal sliding movement in a plane perpendicular to a vertical plane through the centreline and on an opposite side thereof to the fold axis, and an arm may be pivotally connected between the link and the or each lock pin, the connection to the link being located adjacent the pivotal connection between the link and the lever.

Lock means may be provided to lock the blade during its folding movement. In one form, the lock means may include a camming surface adapted for movement with the rotor blade about the fold axis, the camming surface contacting a pivoted lever having a recess for engagement on a lug on the rotor hub during initial movement of the blade from its spread position. Conveniently, the lever carries a spring-loaded plunger to contact the camming surface to effect automatic release of the lock means when the blade moves back into its spread position.

In another form, the lock means may include a curved camming slot adapted for movement with the rotor blade, a pivoted lever having a recess for engagement on a lug on the rotor hub and a pin on the lever engaged in the camming slot to cause pivotal movement of the lever as the blade is moved. In a yet further form the lock means may comprise a vertical spindle located for radial reciprocal sliding movement and carrying vertically spaced-apart locking bosses adapted for engagement during certain phases of operation in tapered jaws, and spring means forcing said spindle into contact with a surface of the link when the blade is in its spread position. Cam plates may be provided and may be rotationally fixed for movement with the blade about the fold axis, the plates having camming surfaces operatively associated with pivotally mounted levers to move the levers into contact with a surface of the locking bosses and retain the bosses in engagement with the tapered jaws when the blade is in its folded position.

The rotary power source may comprise an electromechanical power source including an electric motor and a speed reducing gearbox. Preferably, the motor and gearbox are arranged concentrically and are supported from said hub symmetrically of the longitudinal centreline.

Figure 2:
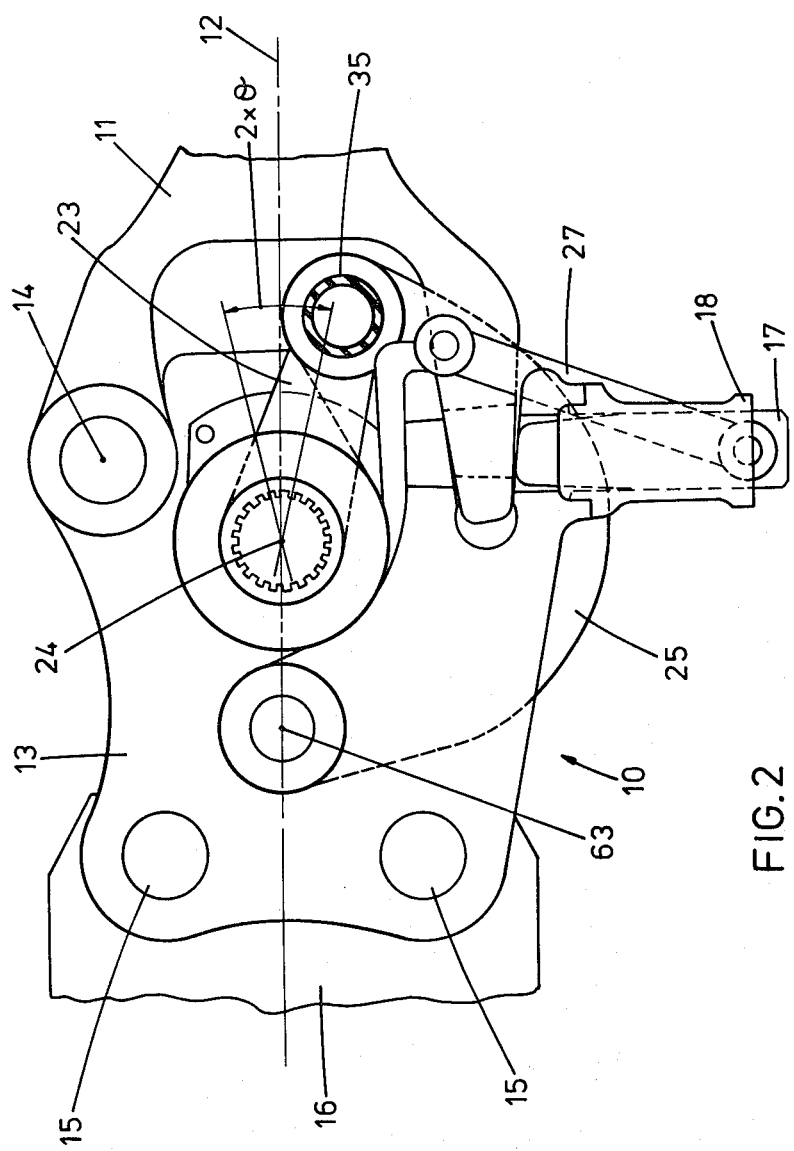
Figure 3:
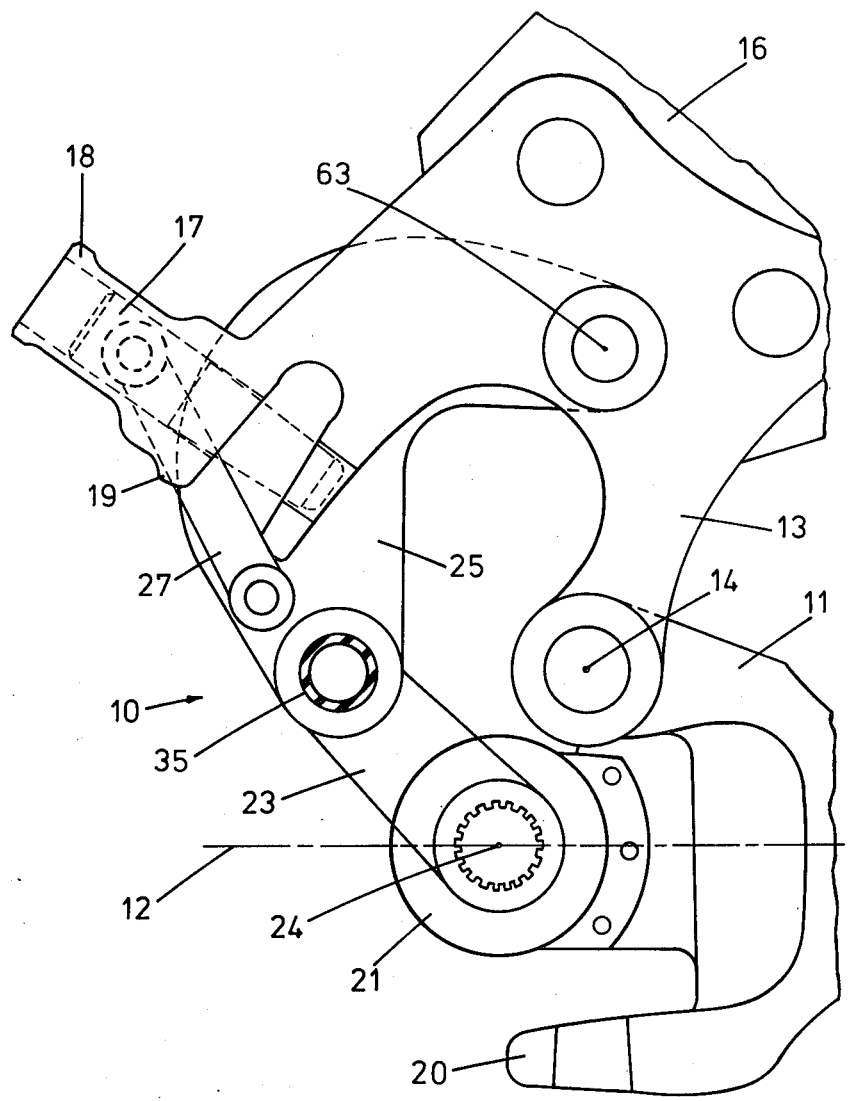
Figure 5:
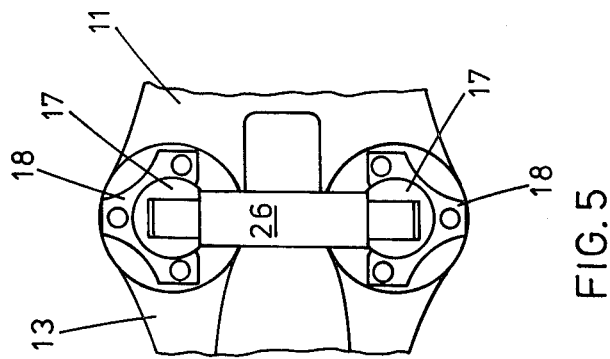
Figure 4:
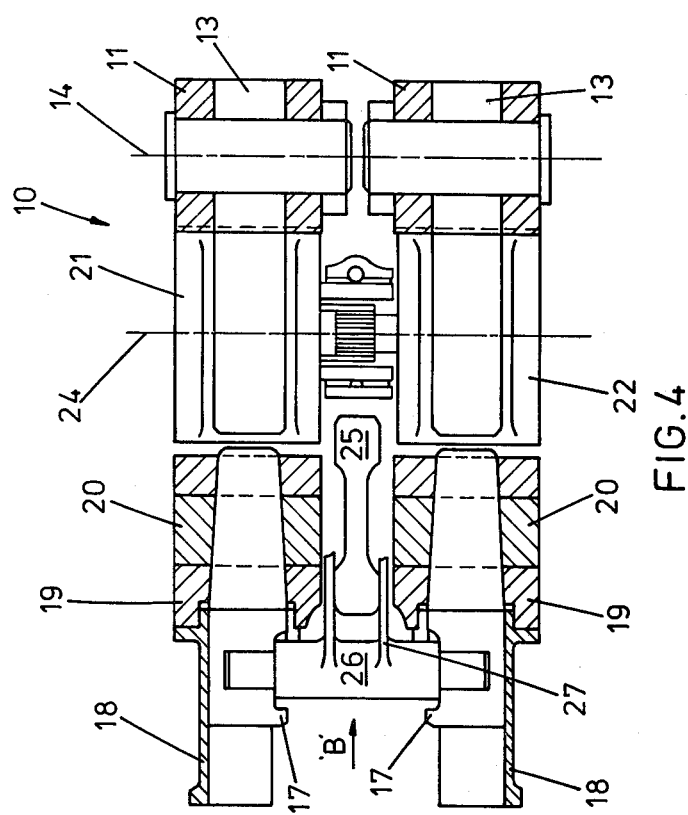
Figure 6:
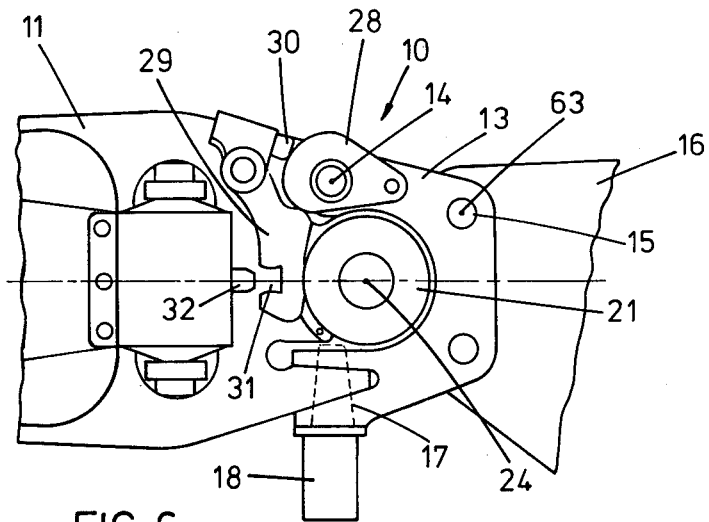
Figure 7:
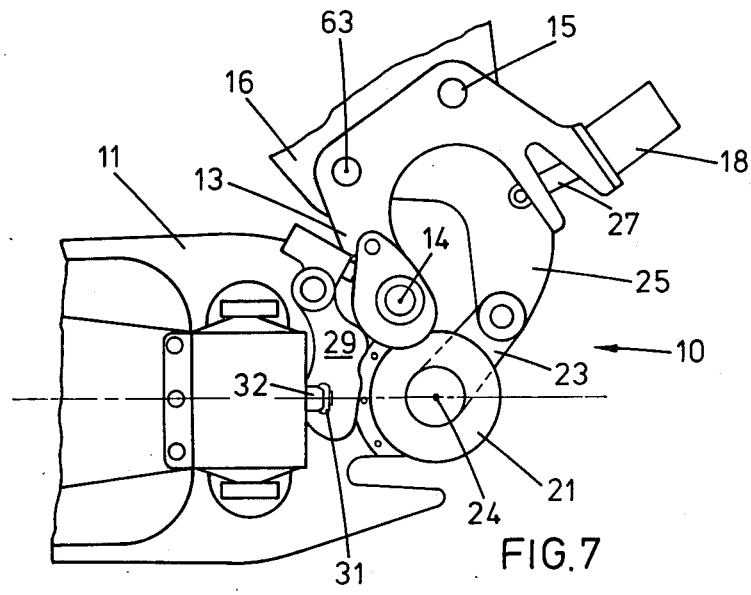
Figure 8:
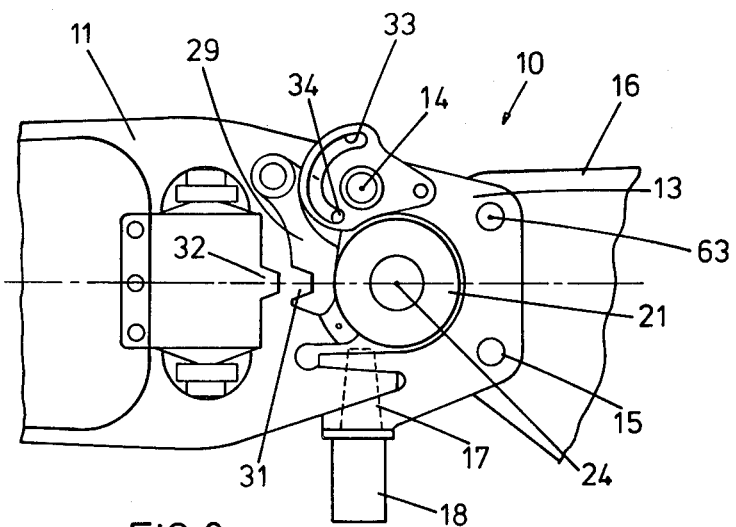
Figure 9:
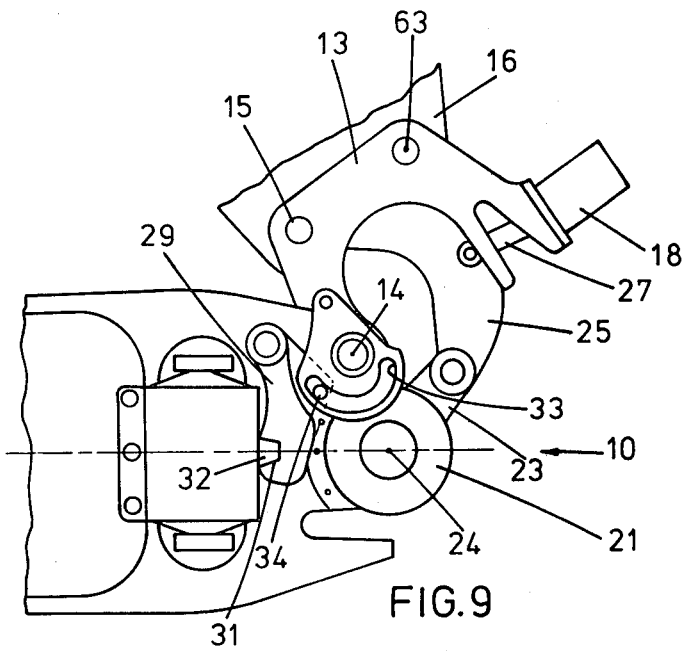
Figure 10:
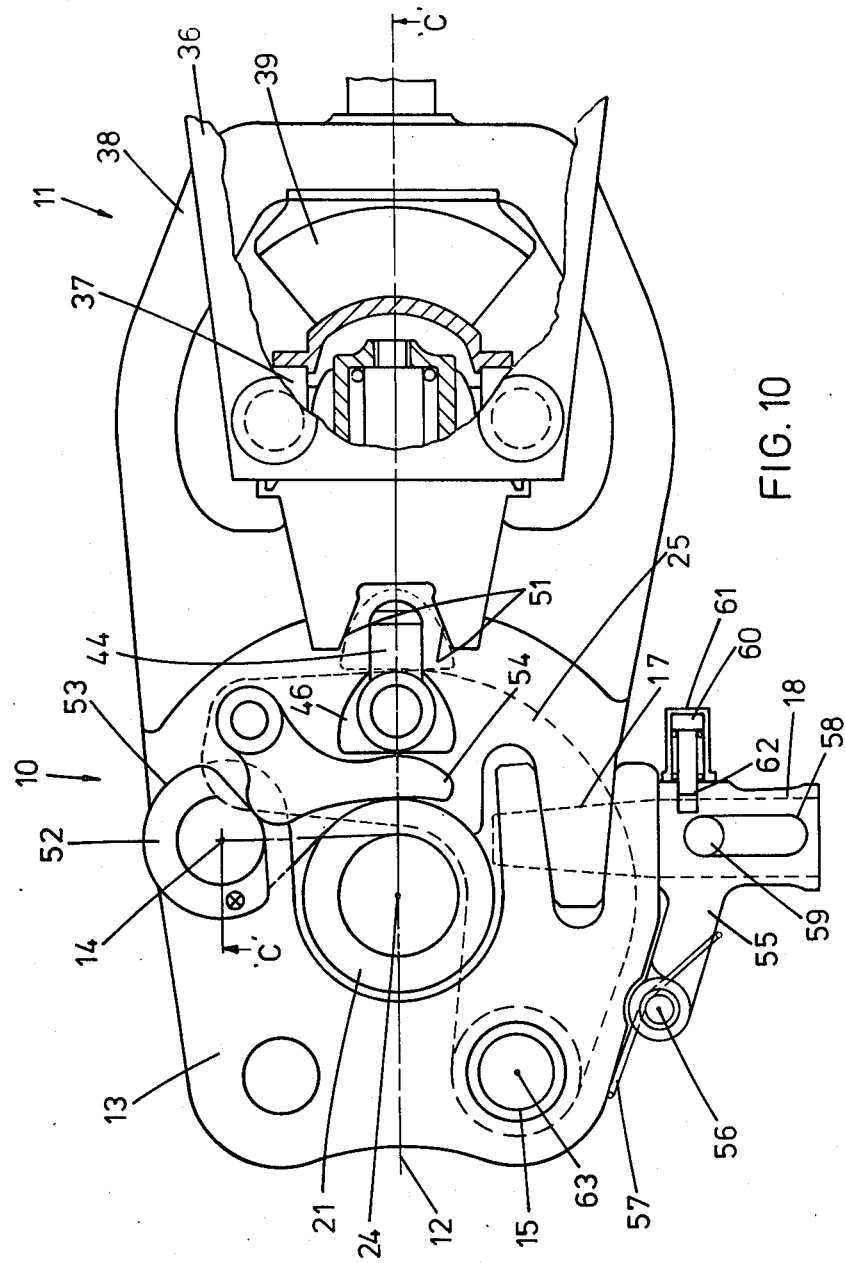
Figure 11:
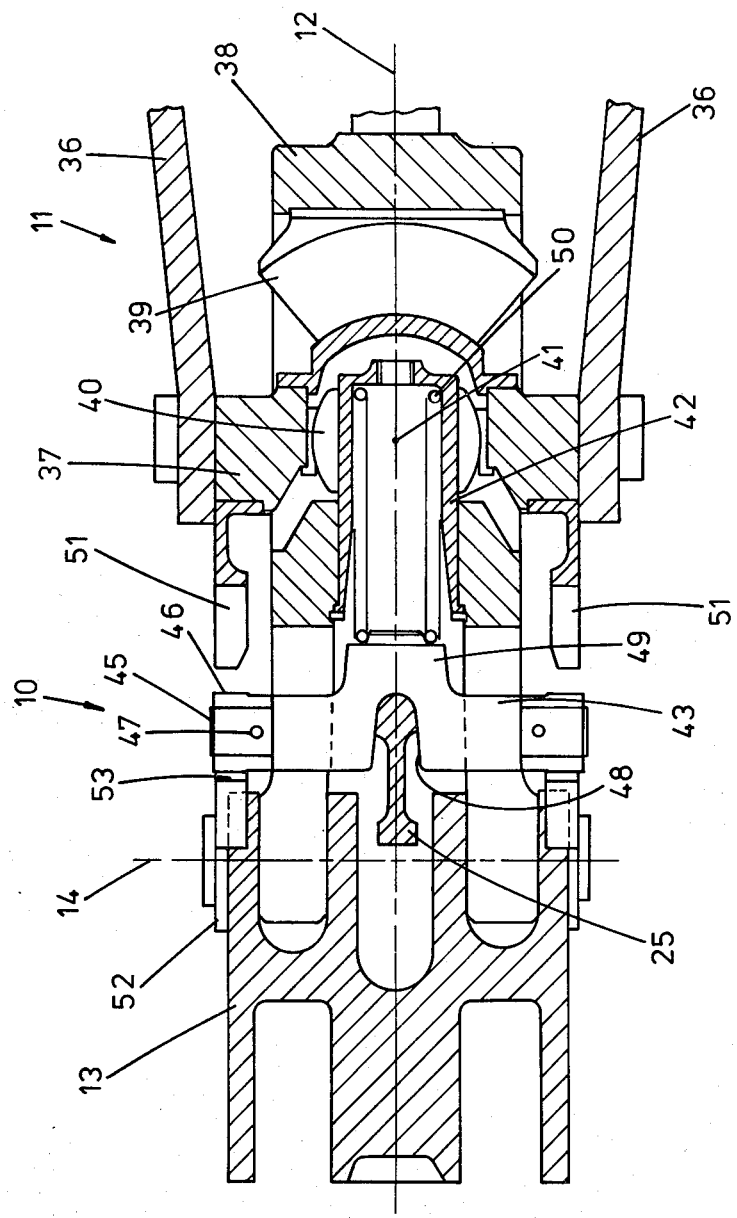

The invention will now be described by way of example only and with reference to the accompanying drawings in which, FIG. 1 is a fragmentary plan view of a helicopter rotor incorporating a powered blade fold mechanism constructed in accordance with one embodiment of the invention and with a rotor blade in a spread position, FIGS. 2 and 3 are illustrations similar to FIG. 1 showing the sequence of movements in folding the rotor blade, FIG. 4 is a sectioned view taken along lines A—A of FIG. 1, FIG. 5 is a fragmentary view taken on arrow B of FIG. 4, FIGS. 6 and 7 are fragmentary plan views of a helicopter rotor incorporating a powered blade fold mechanism according to a further embodiment, and incorporating blade pitch lock means, FIGS. 8 and 9 are fragmentary plan views similar to FIGS. 6 and 7 and illustrating a modified blade pitch lock means, FIG. 10 is a fragmentary part-sectioned plan view of a helicopter rotor having a powered blade fold mechanism according to the invention and incorporating blade pitch, flap and lag lock means, and FIG. 11 is a fragmentary part-sectioned view taken on lines C—C of FIG. 10.

Referring now to FIGS. 1 to 5 inclusive, a helicopter rotor includes a blade folding mechanism generally indicated at 10 located at an outer end of a blade support arm 11 extending radially from a rotor hub (not shown) along a longitudinal centreline 12.

A rotor blade attachment cuff 13 is pivotally connected to arm 11 about a vertical fold axis 14 located to one side of centreline 12, and includes two bolted attachments 15 for connection to a rotor blade 16. Two vertically spaced-apart lock pins 17 are slidably mounted in housings 18 provided on the cuff 13 on the other side of centreline 12 for reciprocating horizontal movement in a direction perpendicular to a vertical plane through the centreline 12. When in the engaged position illustrated in FIG. 1, the pins 17 locate in cooperating apertured jaw portions 19 and 20 formed respectively on the arm 11 and the cuff 13 to prevent separation of the parts when the rotor blade 16 is in the spread, operational, position illustrated in FIG. 1.

An electrically powered actuator 21 and an operatively associated speed reducing gearbox 22 (FIG. 4) are bolted through flanged attachments to the arm 11 and are located generally centrally between the axis 14 and the lock pins 17.

One end of an arm 23 is rotationally fixed to the speed reducing mechanism 22 for rotation about vertical axis 24 coincident with centreline 12 and extends, with the blade 16 in the spread position illustrated in FIG. 1, generally inwardly therefrom.

The free end of lever 23 is pivotally attached to one end of a link 25, the attachment incorporating an annular elastomeric bush 35 for a purpose to be hereinafter described. The link 25 extends generally outwardly and its outer end is pivotally connected to the cuff 13 about a vertical axis 63 coincident with the centreline 12.

The link 25 is curved between its pivotal attachments in order to clear the actuator 21 and, as will be apparent from a viewing of FIG. 1, the arm 23 is located at an acute angle from a line extending through the rotational axis 24 and the vertical attachment axis 63, and is on the same side thereof as the fold axis 14. In the embodiment of FIG. 1 the angle $\sigma$ is approximately 14 degrees, and the line through axes 24 and 63 is, with the blade 16 in the spread position, coincident with the centreline 12.

Referring now to FIG. 4, the ends of a spindle 26 are rotationally located respectively in apertures adjacent an outer end of the respective lock pins 17. The spindle 26 includes inwardly extending integral arms 27 the ends of which are pivotally attached to link 25 adjacent the pivotal attachment of lever 23 (FIG. 1).

FIGS. 2 and 3 are views similar to FIG. 1 showing the rotor blade 16 in various positions during the folding sequence, and will be described in detail hereinafter in respect of the operational features of the invention.

FIGS. 6 and 7 illustrate a further embodiment of the invention, and like reference numerals have been used to identify comparable components. In this embodiment, as shown best in FIG. 7, the pivotal attachment 63 at the end of lever 25 is coincident with one of the bolted attachments 15 securing the blade 16 to cuff 13 thereby reducing the length and the mass of the folding mechanism 10 compared with that of the previous embodiment. The geometrical arrangement of lever 23 and link 25 is similar to that hereinbefore described except that, with the blade 16 in the spread position (FIG. 6) the line through the axes 24 and 63 is located at an angle to the centreline 12 and not coincident with centreline 12 as in the previous embodiment.

An automatic pitch lock mechanism is incorporated in the embodiment of FIGS. 6 and 7 and includes a camming surface 28 on the cuff 13 and located in operative relationship with a pitch lock lever 29 pivotally attached to the arm 11. The lever 29 carries a spring-loaded plunger 30 in contact with surface 28 and incorporates a recess 31 adapted for engagement during certain phases of operation with a lug 32 formed on the arm 11.

FIGS. 8 and 9 illustrate a modified form of pitch lock mechanism comprising a camming slot 33 carried by the cuff 13 for engagement by a pin 34 carried by the pitch lock lever 29. A similar arrangement of recess 31 and lug 32 is provided on the lever 29 and arm 11 respectively as hereinbefore described with reference to FIGS. 6 and 7.

The embodiment of FIGS. 10 and 11 incorporates a blade fold mechanism 10 as hereinbefore described with reference to FIGS. 1 to 5 inclusive, and like reference numerals have again been used to identify similar items. However, this embodiment is adapted for use in an articulated rotor in which one or more bearings are incorporated to provide for movement of the blade in both the flap and lag planes as well as in pitch, and particularly to an articulated rotor utilising an elastomeric bearing for this purpose.

Thus, the blade support arm 11 of this embodiment includes, for each blade, two radially extending and vertically spaced-apart arms 36 joined at their outer ends by a bolted hollow support plate 37. An apertured yoke portion 38 is supported inboard of plate 37 between the arms 36 by a part spherical elastomeric bearing 39, and extends radially outwardly for pivotal attachment to the cuff 13 at the vertical axis 14. A hollow spherical bearing 40 is located centrally of the plate 37 and has a geometrical centre 41 located on the centreline 12 and coincident with the geometrical centre of the elastomeric bearing 39. A tubular spindle 42 concentric with centreline 12 is retained in yoke portion 38, and extends inwardly therefrom for sliding engagement in the bearing 40.

In operation of the rotor of this embodiment, blade pitch changes about centreline 12 are accommodated by torsional movement of the elastomeric bearing 39, and blade flap and lag motions are accommodated by a shear movement. Both of the flap and the lag movements take place about the geometrical centre 41 of the bearings 39 and 40, and the sliding tubular spindle 42 caters for compression of the bearing 39 caused by centrifugal forces.

Particular problems are encountered in the provision of a blade fold facility in a helicopter rotor having an articulated rotor since, apart from the need to lock the blade against changes in pitch as described for example with reference to the embodiments of FIGS. 6 to 9 inclusive, it is also necessary to provide a locking means to effectively lock the blade against movement in the flap and lag planes. This is particularly important in the case of blade articulation by elastomeric bearings since prolonged shear loading in the flap and/or lag planes that would be caused by the folded blade is detrimental to such a bearing and may result in a considerable reduction in its useful life.

The embodiment of FIGS. 10 and 11 is directed at solving this problem in an articulated rotor incorporating a blade fold mechanism 10 as hereinbefore described with reference to FIGS. 1 to 5 inclusive, and only those parts of the blade fold mechanism 10 necessary in the description of this embodiment are shown in the drawings.

However, as in the embodiments of FIGS. 6 and 7, and FIGS. 8 and 9, vertical attachment axis 63 of the link 25 is coincident with one of the bolted blade attachments 15, and is operatively associated with the rotary power source 21 and the lock pins 17.

A vertical spindle 43 having an elongate cross-sectional shape is located in radially extending slots 44 in vertically spaced-apart arms of the yoke 38. The spindle 43 includes integral circular spigots 45 at each of its ends, each spigot carrying a generally triangular locking boss 46 secured by dowels 47. A recess 48 located centrally and to one side of the spindle 43 provides a seating for the outer surface of the link 25 of the blade fold mechanism, and a diametrically opposed boss 49 locates a tension spring 50 centrally of the tubular spindle 42.

The triangular bosses 46 have convex external surfaces for location during certain phases of operation in tapered jaws 51 extending outwardly from attachments on the support plate 37.

Cam plates 52 are rotationally fixed to the upper and lower surfaces of the blade cuff 13 for rotation with the cuff about the vertical axis 14. Each of the cam plates 52 has a cam surface 53 operatively associated with a pivoted lever 54 attached to yoke 38 and having a pressure surface located in close proximity with the base of each of the triangular bosses 46.

Another modification incorporated in the embodiment of FIGS. 10 and 11 concerns the mounting of the housings 18 in which the lock pins 17 are located. Thus, whereas in the embodiment of FIGS. 1 to 5 the housings 18 are fixed to the surface of the cuff 13 to restrain the pins 17 to reciprocating movement in a plane generally perpendicular to a vertical plane through axis 12, in the embodiment of FIG. 10, each of the two housings 18 is pivotally attached to the cuff, being provided with an integral outwardly extending arm 55 pivotally attached at 56 to an external surface of the cuff 13. A spring 57 forces the housing 18 into contact with the surface of the cuff 13 to permit engagement of the respective lock pins 17 with the blade in the spread position.

Each of the housings 18 has a longitudinally extending slot 58 in which a dowel 59 attached to the lock pin 17 is located.

A spring-loaded plunger 50 located in a housing 61 extends inwardly from an inboard surface of each housing 18. The plunger 60 is slidably mounted in an aperture 62 through the wall of the housing 18 and is aligned, when the lock pin 17 is inserted, with a recess 62 in the surface of the lock pin 17.

Operation of the blade fold mechanism of this invention will now be described with reference to the embodiment illustrated in FIGS. 1 to 5 inclusive. With the blade 16 in its fully spread, operational, position of FIG. 1, the lock pins 17 are engaged to positively lock the blade 16 to cater for operational loadings.

When it is desired to fold the blade 16, the actuator 21 is energised to rotate the lever 23 about axis 24 in a clockwise direction via the gearbox 22. It will be apparent from a comparison of FIGS. 1 and 2, that initial movement of lever 23 serves to move the free end of lever 23 through an arc equal to 2 times $\sigma$ (28 degrees in the illustrated embodiment) and through an over-centre relationship relative a line through axes 24 and 63. At the extremes of this initial arc of movement of the lever 23 there is no change in the linear distance between the axis 63 and the pivot axis of the attachment of link 25 to the lever 23, so that no movement of the blade 16 is required to accommodate the movement of the lever 23; however, it does constitute an important feature of the invention in that this initial arc of movement of the lever 23 is transmitted through arms 27 to withdraw the lock pins 17 from the engaged position of FIG. 1 to the disengaged position of FIG. 2. The slight relative movement which occurs at the pivotal attachment between the lever 23 and the link 25 during movement of lever 23 through the initial arc is permitted by compression of the elastomeric bush 35.

Further clockwise movement of the lever 23 from the position of FIG. 2 is transmitted through link 25 to the cuff 13 to pivot the cuff 13 and therefore the attached blade 16 about axis 14 through a predetermined arc to its folded position. In the illustrated embodiment the blade 16 moves through an arc of approximately 240 degrees to its folded position of FIG. 3; however, it will be apparent that this arc will vary between the blades of a set of blades. It is another feature of the invention, illustrated in FIG. 3, that as the blade 16 is moved towards its folded position, the mechanism is such as to automatically draw the lock pins 17 back into the apertures in jaw portion 19 of cuff 13 thereby preventing the ingress of dirt and moisture and damage to the lock pins 17 when the blade is in its folded position.

Referring now to the embodiment of FIGS. 6 and 7, the folding operation is accomplished similarly to that previously described. However, with the blade 16 in its spread, operational, position of FIG. 6, the spring loaded plunger 30 retains the pitch lock lever 29 in a position in which the aperture 31 is disengaged from the lug 32 so as to permit pitch change movement of the respective rotor blade 16 during operation. On folding, initial movement of the cuff 13 about axis 14 causes the camming surface 28 to pivot the pitch lock lever 29 into the position illustrated in FIG. 7 in which the aperture 31 is engaged with lug 32 to prevent pitch movements of the blade both during folding and when the blade is in its folded position.

The embodiment of FIGS. 8 and 9 is similar to that of FIGS. 6 and 7 except that the inter-engaged camming slot 33 and pin 34 serves the dual function of retaining the pitch lock lever 29 in a disengaged position when the blade 16 is spread (FIG. 8) and of moving the lever 29 to its engaged position as soon as the blade 16 commences movement into its folded position (FIG. 9).

In operation of the helicopter rotor illustrated in FIGS. 10 and 11, the centrifugal forces caused by rotation act on the plunger 60 to overcome the force of the spring loading and move the plunger 60 into the recess in the lock pin 17 to positively retain the lock pin 17 in its engaged position with the rotor blade in the spread position. As the rotor slows, the decaying centrifugal force is overcome by the spring force to move the plunger 60 out of engagement with the lock pin 17.

Blade folding about axis 14 is accomplished in the same manner as hereinbefore described with reference to the embodiment of FIGS. 1 to 5 inclusive; therefore, the following description is concerned only with particular features of this embodiment.

Thus, as the link 25 moves through the over-centre position to withdraw the lock pins 17, the dowel 59 moves towards the end of slot 58. When contact occurs, further movement of lever 25 pivots the housing 18 and the lock pin 17 about attachment 56 and against the force of the spring 57 to prevent protrusion of the lock pins 17 when the blade is in its folded position.

Initial movement of the link 25 through the over-centre position applies a force through the portion of the surface of the lever 25 located in the recess 48 to drive the spindle 43 towards the blade support arm 11, thereby engaging the convex surfaces of the locking bosses 46 with the tapered jaws 51 as indicated in broken outline in FIG. 10. Thereafter, the initial rotation of the cam plates 52 about fold axis 14 causes the pressure surfaces of pivoted levers 54 to follow the bosses 46 into engagement to retain the bosses 46 in contact with the jaws 51 when the surface of link 25 moves out of contact with spindle 43 during the blade fold cycle.

As the bosses 46 are moved into the tapered jaws 51, the blade and therefore the elastomeric bearing 39 is automaticaly centred. Moreover, the engagement effectively locks the blade in pitch and in both the blade flap and lag planes thereby isolating the elastomeric bearing 39 from any undesirable shear loading both during folding and whilst the blade is in its folded position.

During the major part of the blade spreading operation, the bosses 46 are retained in engagement with the jaws 51 by the cam plates 52 and levers 54, while the housings 18 are moved back into contact with the surface of the cuff 13 under the influence of the springs 57. Towards the end of the blade spreading movement of the cuff 13 the force applied by levers 54 is automatically withdrawn and the spindle 43 allowed to return outwardly into contact with the co-operating surface of the link 25 under the influence of the spring 50, to free the jaws 51 and the bearing 39 to support the blade as the lever 23 moves to reinsert the lock pins 17.

Thus, the powered fold mechanism of the present invention provides for extraction of the lock pins, blade folding and re-insertion of the lock pins from a single power source. The geometry of the system is simple and is arranged so that full power is available for extraction and re-insertion of the lock pins during that part of the operation cycle when the folding motion of the mechanism is operationally dead. This results from the initial movement of lever 23 and link 25 through a dead period (as far as blade folding is concerned) during which the lock pins 17 are moved clear before effective folding movement occurs, and is achieved by the complementary action of the arcs of movement of the lever 23 and link 25 to provide substantially non-active motion as far as folding is concerned and active motion for operation of the locking pins 17.

The four-lug arrangement, comprising two hinge pins on fold axis 14 and two lock pins 17, effectively sustains both flap and lag movements during operation and provides a symmetry of masses about the pitch axis, that is coincident with centreline 12. The offset fold axis 14 assists with fold clearance problems.

Furthermore, the space between the lugs of the arm 11 provides a convenient location for the actuator 21 and speed reducing gearbox 22. It will be noted that the masses of the actuator 21 and gearbox 22 are also symmetrical about the pitch axis, which ensures equilibrium whether the blade is to be folded in either the lead or the lag direction.

The actuator 21 and gearbox 22 are attached to the arm 11 thereby avoiding an undesirable flexing of electric supply cables during folding, while also making the actuator 21 and gearbox 22 readily accessible for servicing and/or replacement with the blade 16 in its folded position, and without the need to remove rotor blade 16 for this purpose. On the other hand, it will be noted that, in the blade spread configuration, the power source and the operating linkage are located entirely within the mechanism so as to be protected from damage during operation.

Thus, the powered fold mechanism of this invention is relatively simple and compact providing for reliability of operation and minimising both the weight of the rotor and the aerodynamic drag penalty during flight. The respective embodiments of FIGS. 6 and 7 and FIGS. 8 and 9 both facilitate a further reduction in the space envelope required for incorporation of the blade fold mechanism 10 and incorporate simple, automatically operable pitch locking mechanisms, whereas the embodiment of FIGS. 10 and 11 provides the additional features of a lock effective in the pitch, flap and lag planes that is particularly suited to incorporation in an articulated rotor.

Whilst several embodiments of the invention have been described and illustrated, it will be understood that many modifications can be made without departing from the scope of the invention as defined in the appended claims. For example, the described electro-mechanical power source may be replaced by other means such as electro-hydraulic or hydro-mechanical depending on the energy source available at the rotor. Alternatively, the power source may be remote from the fold mechanism in which case the lever 23 may be adapted for rotation about axis 24 and for selective engagement by the power source only when it is required to fold the blades 16.

What is claimed is:

1. A helicopter rotor having a rotor hub, a blade pivotally connected to the hub for movement between an operational spread position and a folded position about a generally vertical fold axis (14) located at one side of a longitudinal centerline, at least one laterally extending lock pin for locking the blade in the spread position and a powered fold mechanism comprising a reversible rotary power source for rotation about a generally vertical rotation axis (24) coincident with the centreline, a lever (23) rotationally fixed to the power source, a curved link having one end pivotally attached to the blade about a vertical pivot axis (63) spaced-apart radially of the axis (24) and its other end pivotally attached about a vertical pivot axis (35) to the free end of said lever and an arm pivotally attached between the curved link and the said lock pin, wherein with the blade in the spread position the said vertical pivot axis (35) is located in an over-center position and at an acute angle relative a line extending through the said rotation axis (24) and the pivot axis (63) and on the same side of the line as the fold axis (14).

2. A rotor as claimed in claim 1 and further including a blade attachment cuff pivotally connected to the hub, said blade being pivotally connected to said blade attachment cuff, the vertical fold axis being coincident with said pivotal connection between the hub and blade attachment cuff.

3. A rotor as claimed in claim 1 wherein the pivotal connection between said arm and said curved link is located adjacent the pivotal connection between said curved link and the lever.

4. A rotor as claimed in claim 1, wherein, with the blade in the spread position, said lever is located at an acute angle from a line extending through the rotational axis (24) and the vertical attachment axis (63) and on the same side thereof as said fold axis.

5. A rotor as claimed in claim 4, wherein, with the blade in the spread position, the vertical attachment axis (63) is coincident with said centreline.

6. A rotor as claimed in claim 4, wherein the vertical attachment axis is coincident with the bolted blade attachment (15).

7. A rotor as claimed in claim 2 and including a resilient annular bush (35) located in one of said pivotal connections of said link.

8. A rotor as claimed in claim 2, wherein each said lock pin is supported for horizontal sliding movement in a plane perpendicular to a vertical plane through said centreline and on an opposite side thereof to the fold axis (14).

9. A rotor as claimed in claim 1, and including lock means adapted to lock the blade during its folding movement.

10. A rotor as claimed in claim 9, wherein said lock means includes a camming surface (28) adapted for movement with the rotor blade about said blade fold axis, said camming surface contacting a pivoted lever (29) having a recess (31) adapted for engagement on a lug (32) on the rotor hub during initial movement of the blade from its spread position.

11. A rotor as claimed in claim 10, wherein said lever carries a spring-loaded plunger (30) adapted to contact said camming surface to effect automatic release of the lock means when the blade moves back into its spread position.

12. A rotor as claimed in claim 9, wherein said lock means includes a curved camming slot (33) adapted for movement with the rotor blade, a pivoted lever 29 having a recess (31) adapted for engagement on a lug (32) on the rotor hub and a pin (34) on the lever engaged in said camming slot to cause pivotal movement of the lever as the blade is moved.

13. A rotor as claimed in claim 9, wherein said lock means comprises a vertical spindle (43) located for radial reciprocal sliding movement and carrying vertically spaced-apart locking bosses (46) adapted for engagement during certain phases of operation in tapered jaws (51), and spring means (50) forcing said spindle into contact with a surface of said link when the blade is in its spread, operational, position.

14. A rotor as claimed in claim 13, and including cam plates (52) rotationally fixed for movement with the blade about the fold axis, and having camming surfaces (53) operatively associated with pivotally mounted levers (54) so as to move the levers into contact with a surface of the locking bosses to retain the bosses in engagement with the tapered jaws when the blade is in its folded position.

15. A rotor as claimed in claim 1, wherein said rotary power source comprises an electro-mechanical power source including an electric motor (21) and a speed reducing gearbox (22).

16. A rotor as claimed in claim 15, wherein the motor and gearbox are arranged concentrically and are supported from the hub symmetrically of the longitudinal centreline.

* * * * *